May 7, 1940.   J. S. HERBERT   2,199,724
INHALATOR
Filed March 13, 1939
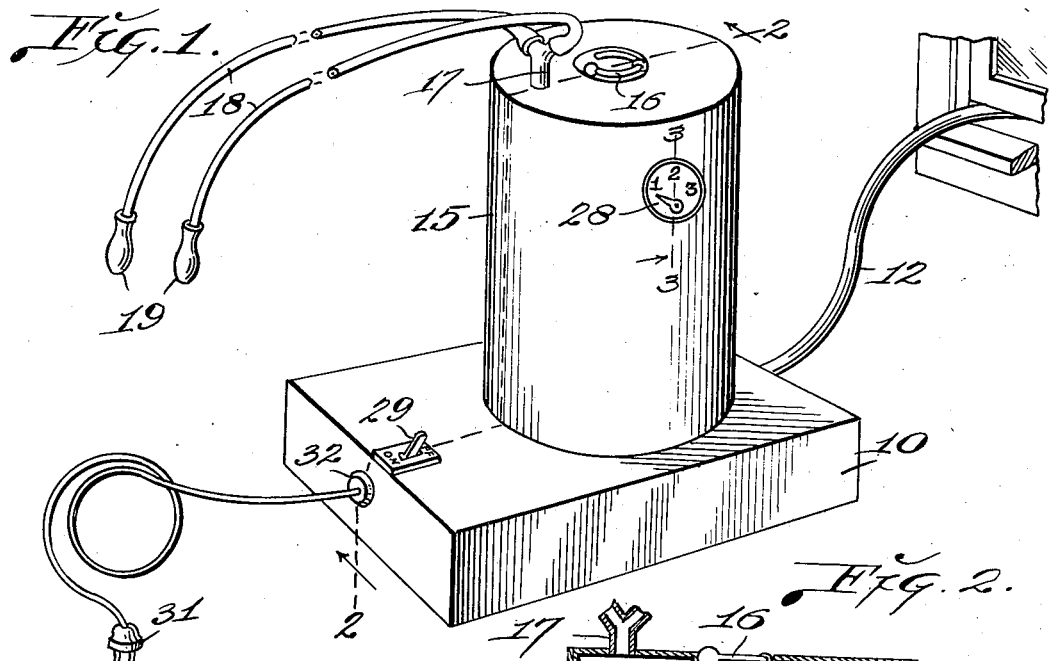
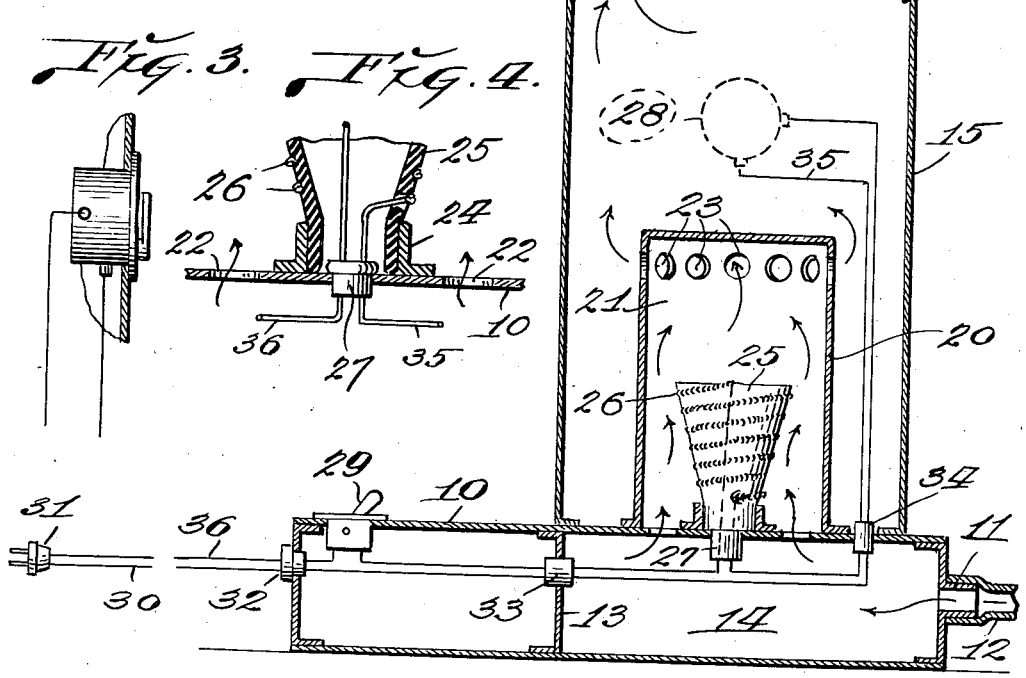
INVENTOR:—
JOHN S. HERBERT.
BY Martin C. Smith
ATTY.

Patented May 7, 1940

2,199,724

UNITED STATES PATENT OFFICE 2,199,724

INHALATOR

John S. Herbert, Earlimart, Calif.

Application March 13, 1939, Serial No. 261,553

2 Claims. (Cl. 128—145)

My invention relates to a nasal inhalator and has for its principal object, the provision of a relatively simple, practical and inexpensive apparatus for processing fresh air by thoroughly heating and expanding the same in order to disintegrate the water vapor contained in the air and separate the molecules thereof and which heated air is inhaled in the treatment of pulmonary affections, likewise for the treatment of colds in the head and throat, for influenza, and likewise for the treatment of sinus affections.

The medical profession have long recognized that warm, expanded air that generally prevails in desert regions is very beneficial in the treatment of affections of the nasal passages and cavities, the throat and the lungs, and it is one of the objects of my invention to, provide an apparatus that may be conveniently and economically employed for heating air to pre-determined degrees of temperature, thus producing air conditions that are practically the same as those prevailing in desert regions.

Further objects of my invention are, to provide an inhalator having improved means for heating the air by means of an electric heating coil, further to provide an apparatus whereby the heating of the air is controlled by means of a thermostat and further, to provide an inhalator that is compact in construction and in the assembly of its elements and which is entirely practical and highly efficient for its intended purposes.

A further object of my invention is, to provide an improved form of air heater for the inhalator and which heater is constructed so that the fresh air at atmospheric temperature flows upwardly around a substantially funnel-shaped heating coil so as to quickly and effectively process by heating the fresh air that enters and passes through the inhalator.

With the foregoing and other objects in view, my invention consists in certain novel features of construction and arrangement of parts that will be hereinafter more fully described and claimed and illustrated in the accompanying drawing in which:

Fig. 1 is a perspective view of an inhalator constructed in accordance with my invention.

Fig. 2 is an enlarged vertical section taken on the line 2—2 of Fig. 1.

Fig. 3 is an enlarged vertical section taken on the line 3—3 of Fig. 1.

Fig. 4 is a detail section taken through the lower portion of the electric heating element and its support.

Referring by numerals to the accompanying drawing which illustrates a preferred embodiment of my invention, 10 designates a housing, preferably formed of sheet metal and of any desired shape although, as illustrated in the drawing, I prefer to construct said housing substantially rectangular in form and, detachably connected to a nipple 11 that is preferably located in the rear wall of the housing is a flexible tube 12 that is utilized for conveying fresh air to the apparatus and which flexible tube is of sufficient length to be extended through a window or other opening in the building in which the apparatus is used.

In order to minimize the size of the chamber in the housing 10 that receives the fresh air from tube 12, a transverse partition 13 is located in the housing 10 at a point intermediate its ends and, suitably secured on top of the housing above the chamber 14 between partition 13 and the rear wall of the housing is a vertically disposed housing 15, preferably cylindrical in form and composed of sheet metal. Chamber 14 into which atmospheric air is delivered by tube 12 is located directly beneath the heater that is utilized for heating the air and thus said chamber will become heated to a certain degree above the temperature of the atmosphere, due to the proximity of said chamber 14 to the heating element, and thus the air passing through said chamber is preheated to a certain degree before it passes into and through the main or principal heating chamber.

Seated in a depression that is formed in the top of the housing 15 is a conventional thermometer 16, preferably of the type utilized for indicating the temperature of ovens and, secured to the top of housing 15 is a Y connection 17. Connected to the arms of this Y connection are flexible tubes 18, preferably of rubber, and carried by the ends thereof are applicators 19, preferably soft rubber nipples of such size and shape as to be conveniently placed in the nostrils.

Secured on top of the housing 10 within the housing 15 is a small housing 20, preferably formed of sheet metal, the upright wall of which is spaced apart from the wall of housing 15 and the chamber 21 within this small housing functions as an air processing chamber. Formed through the top of housing 10 adjacent the lower end of the wall of housing 20 is, a series of apertures 22 that permits fresh air preheated to a certain degree within the chamber 14 to pass upwardly into the processing chamber 21.

Formed through the upper portion of housing 20, preferably in the upright wall thereof is, a plurality of apertures 23 that permits the processed air to pass from chamber 21 upwardly into the chamber within housing 15.

Suitably secured on top of the housing 10 within housing 20 and inside the row of apertures 22 is, a collar 24 in which is removably seated the lower end of a substantially funnel-shaped member 25 of insulating material, such as porcelain, asbestos, or the like. Arranged on the external surface of the member 25 is an electric heating element 26, preferably coiled wire, that offers resistance to the passage of an electric current and, the ends of this heating coil are extended downwardly through a plug 27 of insulation that is seated in the top of housing 10 within the collar 24.

Seated in the upper portion of the wall of housing 15 is a thermostat 28, preferably of the type that may be manually adjusted so as to open an electric circuit as pre-determined degrees of temperature are developed in the apparatus. While in the present instance, I have shown a thermostat that may be adjusted so as to open the circuit when any one of three different temperatures have been developed in the apparatus it will be understood that, a thermostat having a wider range of adjustment may be employed. Thermostats particularly applicable for use in my improved inhalator may be obtained in the open market.

Seated in the top of housing 10 adjacent its front end is a conventional electric switch 29. One wire 30 of an electric circuit leads from a conventional plug 31 through an insulator 32 located in the front wall of housing 10, thence through an insulator 33 located in partition 13, thence through an insulator 34 located in the top wall of housing 10 between the lower portions of the housings 15 and 20 and, thence to one of the contacts of thermostat 28.

From the other contact of the thermostat a wire 35 passes through insulator 34, thence through insulator plug 27 to one end of the heating element 26 and from the other end of said heating element through insulator 27, thence through insulator 33 to one side of switch 29 and, from the other side of this switch a wire 36 leads through insulator 32 to plug 31.

To prepare the inhalator for use, air inlet tube 12 is extended to a point where fresh air may freely enter its open end and plug 31 is inserted in the socket of an ordinary household electric lighting and heating system. Obviously, if there is no electric supply line, the wires 30 and 36 may be suitably connected to a storage battery which delivers electric current of the required voltage.

The thermostat is now adjusted so that it will automatically open when a pre-determined degree of heat prevails in the upper portion of the chamber within housing 15 and switch 29 is shifted to closed position. Under such conditions, electric current flows through heating element 26 to heat the same and as heat is thus developed, the air within the chamber 21 in housing 20 will be heated and expanded and, this heated air flows upwardly and passes outwardly through the apertures 23, thence upwardly through the upper portion of the chamber in housing 15 and thence through tubes 18 and applicators 19. The heated air thus discharging from chamber 21 produces a flow of air from the open end of flexible tube 12 through said tube into preheating chamber 14, thence upwardly through the apertures 22 into the processing chamber 21 and thus, while the device is in operation a continuous flow of fresh air passes into the processing chamber and said air in a heated and expanded condition discharges from the processing chamber through the apertures 23 to the upper portion of the chamber in housing 15 and from thence through tubes 18 to the applicators 19.

The effective heating of the air in the comparatively small chamber 21 necessarily expands said air, together with any moisture or water vapor carried thereby, and thus the molecular structure of the water vapor is disintegrated or broken down so as to separate the molecules so that the air is placed in condition so as to materially increase its capacity to absorb additional moisture or water vapor as it is inhaled by the users of the apparatus.

The person using the inhalator places the applicators 19 in the nostrils and inhales the heated expanded air and exhales through the mouth, thereby establishing a circulation of pure fresh air into the apparatus to be heated and expanded and then drawn through the tubes 18 and applicators 19 during the inhaling function.

Thus heated air is delivered directly to the nasal passages, the sinuses, and to the lungs, so as to speedily absorb and evaporate nasal secretions and produce helpful effects in the treatment of colds of the head and throat, influenza, sinus affections, and likewise ailments of the throat and lungs.

The thermometer 16 enables the user of the device to always readily observe the temperature of the air that is being inhaled and, if for any cause the air should become heated to a greater degree than that desired the adjustable thermostat will act automatically to open the electric circuit and thereby render the appliance inoperative for the time being.

Among the specially advantageous features of my invention are, the arrangement and construction whereby pure fresh air taken from the exterior of the building in which the inhalator is located, is processed, and in such condition delivered directly to the person using the apparatus and further, the control means that acts automatically to cut off the air heating means in the event that there is tendency to overheat or heat to a temperature above that desired.

It is an established fact that pure fresh air containing its normal oxygen content is much more beneficial in the treatment of pulmonary disorders than "dead air" or air that has been confined for any length of time and with the oxygen content depleted.

Thus it will be seen that I have provided a nasal inhalator that is relatively simple in construction, inexpensive of manufacture and very effective in performing the functions for which it is intended.

It will be understood that minor changes in the size, form and construction of the various parts of my improved inhalator, may be made and substituted for those herein shown and described, without departing from the spirit of my invention, the scope of which is set forth in the appended claims.

I claim as my invention:

1. An inhalator of the class described, comprising a base member, said base member being hollow and closed on all sides and having a top formed of heat conductive material, at least one air inlet in said member, a closed heating chamber immediately on top of said heat conducting top, an air outlet through said top and discharging into said heating chamber, a heating element in said chamber and seated on said heating conductive top, said heating element being operative to heat both said heating chamber and the interior of said base member, a discharge opening in said heating chamber adjacent the top thereof, a closed casing carried by said top of said base member and surrounding said heating chamber, and at least one discharge opening in a top portion of said casing.

2. The structure of claim 1, said heating element comprising a renewable member removably attached to said top of said base member, a manually adjustable thermostat carried by an exterior portion of said casing, and said base member, heating chamber and casing being arranged to permit a substantially uninterrupted upflow of air through said base member for preheating, thence through said heating chamber for heating, thence upwardly into said casing for temporary storage prior to discharge through said discharge opening of said casing.

JOHN S. HERBERT.